INVENTORS:
KARL DYK
MOSES B. WIDESS
BY Newell Pottorf
ATTORNEY

INVENTORS:
KARL DYK
MOSES B. WIDESS
BY
ATTORNEY

United States Patent Office 2,880,816
Patented Apr. 7, 1959

2,880,816

SEISMIC SURVEYING WITH SHEAR WAVES

Moses B. Widess and Karl Dyk, Tulsa, Okla., assignors to Pan American Petroleum Corporation, a corporation of Delaware Application November 30, 1955, Serial No. 552,960

5 Claims. (Cl. 181—.5)

This invention relates to seismic geophysical surveying, and is directed particularly to the utilization of shear waves for this purpose. More specifically, it is directed to the generation of shear waves by explosive means and the detection of such waves by detectors placed close to the seismic-wave source.

The existence and manner of propagation of seismic shear waves through the earth have been known and understood for many years. In spite of this fact, little use has been made of shear waves in seismic geophysical prospecting. Present-day methods of seismic geophysical prospecting are based almost exclusively upon generating and receiving compressional (longitudinal) seismic waves. Probably the most obvious reason for this is that explosives are preferred as the means for generating the compressional seismic waves and as ordinarily employed, are most efficient for this purpose. While it is recognized that the detonation of explosives can create shear waves, the bulk of such shear-wave energy propagates horizontally and very little, if any, appears in the vertically traveling energy, which is chiefly compressional.

One effort to utilize seismic shear waves for geophysical surveying purposes is represented by Ricker Patent 2,354,548. In this case, however, it is not the shear waves generated at the location of the explosive charge which are received, but rather shear waves generated as a result of the incidence of compressional waves on a formation boundary at a large angle from the vertical. Thus, the travel time of the waves observed by Ricker is the travel time of a compressional wave from the shot point to the point of conversion, plus the travel time of a shear wave from the point of conversion. By contrast, the travel times of the waves to be observed in the present invention correspond to travel at shear-wave velocity from the location of the explosive charge to the reflecting interface and thence to the receiver.

It is accordingly a primary object of our invention to provide a novel method and apparatus for generating and receiving shear waves for geophysical surveying purposes. A more specific object is to provide a method and apparatus for generating, by explosives, shear waves adapted for use in geophysical surveying by a reflection method wherein the reception of other types of waves than the desired shear waves is strongly discriminated against. A still further object of the invention is to provide a novel method and apparatus for generating vertically-traveling seismic-wave energy which includes a substantial proportion in the form of shear waves. Other and still further objects, uses, and advantages of the invention will become apparent as the description proceeds.

It is believed that a chief reason why shear-wave reflections are seldom observed, particularly by receivers placed close to the shot point, is that the seismic energy generated by an exploding charge is normally approximately symmetrical about a vertical axis passing through the charge. Similarly, when the two or more charges are fired simultaneously in a multiple-charge pattern, there is symmetry about a vertical line or plane passing between the charges. As regards substantially vertically-propagating energy around an exploding charge, this means that, in any horizontal plane, for each horizontal movement of an earth particle in a radial direction away from or toward the charge axis, there is a substantially equal and opposite particle motion at a point diametrically opposed to the first point. Consequently, in the down-traveling seismic-wave energy there is very little in the form of shear waves.

This is not necessarily true of energy traveling horizontally away from the shot point, since the stratification of the earth in generally horizontal layers of different wave-transmitting properties is able to disturb the symmetry about a horizontal plane passing through the center of the charge. This horizontal shear-wave energy is seldom recognized as such, however, and usually constitutes noise in interference with the receipt of approximately vertical compressional waves by the usual seismometer spreads.

Briefly stated, our invention comprises deliberately preventing, by certain configurations of explosive, the occurrence of symmetry about a vertical axis or plane, so that the down-traveling seismic-wave energy contains an appreciable proportion of shear-wave energy. This propagates vertically by virtue of substantially horizontal particle motions in a given geographical direction. Accordingly, this energy is detected, after reflection at subsurface interfaces, by seismic-wave detectors whose axes of sensitivity are preferably aligned about parallel to the horizontal particle motion by which the shear waves are vertically propagated.

There appear to be at least three different modes of principles by which non-symmetry of explosive-charge pressures in an earth medium can be insured. Horizontal spacing or elongation of explosive charge materials which detonate in succession or with small time delays produces a non-symmetrical pattern of horizontal earth displacements. Also, detonation of an explosive charge near the boundary of two contrasting or different wave-transmitting media results in differential particle motions in the two media and a resultant propagation of shear energy in a direction parallel to the boundary. Accordingly, this can be utilized for vertical shear-wave generation by arranging the boundary between the two media to be generally vertical. A further mechanism by which non-symmetrical explosion pressures can be created resides in the shaping of the explosive material itself, for example, by the use of concave and convex surfaces on the explosive charge.

In arrangements of explosive for carrying out our invention, any one or any combination of these mechanisms may be employed.

This will be better understood by reference to the accompanying drawings forming a part of this application and illustrating certain preferred embodiments of the invention, together with a number of different arrays of explosive materials utilizing the principles mentioned above. In these drawings.

Figure 1:
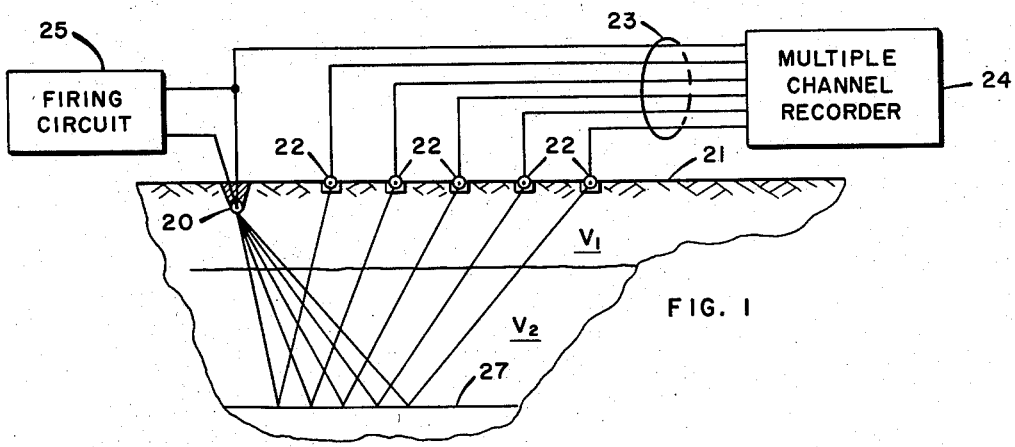
Figures 1 and 2 are respectively a cross section and a plan view of a preferred embodiment of the invention.

Referring now to the drawings in detail, and particularly to Figure 1 thereof, a typical embodiment of the invention is shown in operating position relative to a portion of the earth's surface and subsurface, shown in vertical cross section diagrammatically. Thus, a shear-wave-generating explosive charge 20 is placed below the earth's surface 21, along with a spread of detectors 22 connected by suitable insulated leads 23 to a multiple-channel recorder 24. A firing circuit 25 is provided for initiating the detonation of charge 20.

Figure 2:
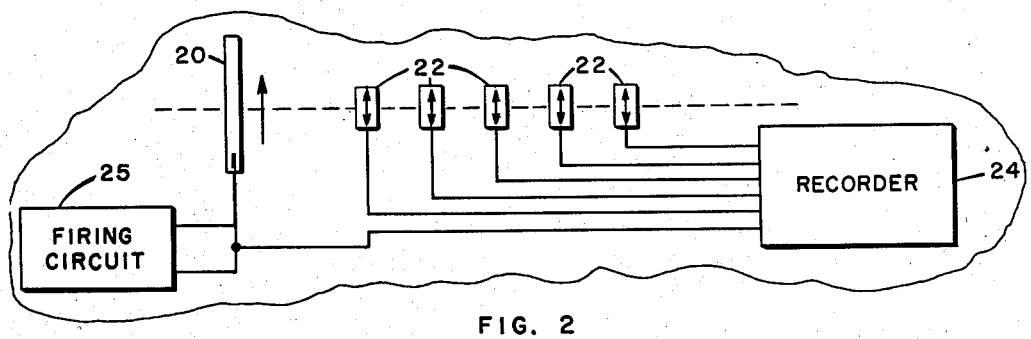

As appears more clearly in Figure 2, which is a horizontal plan view, the charge 20 may comprise an elongated explosive column, for example, from 50 to several hundred feet in length, placed at the bottom of a horizontal trench. The detectors 22 have horizontal sensitivity axes, as indicated by the small arrows, which are oriented parallel to the long dimension of charge 20. Preferably, but not necessarily, the long dimension of charge 20 is placed perpendicular to the line of detectors 22. When this is done, maximum discrimination is provided against receiving compressional waves, which are unavoidably generated upon the detonation of the charge 20, in addition to the desired shear waves.

Figure 3:
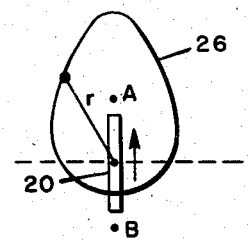
Figure 3 is a graphical representation of the pressure field around an exploding elongated charge.

When the charge detonation is initiated from one end of the charge 20, the resultant horizontal pressure distribution is highly non-symmetrical as shown in Figure 3. Thus, when the detonation of the charge has proceeded from one end toward the other in the direction of the arrow shown on Figure 3, preferably at a velocity close to the longitudinal seismic-wave velocity in the earth medium surrounding the charge, then the line 26 may be taken to represent the resultant pressure distribution in a horizontal plane a short time thereafter.

This line or plot 26 represents the pressure distribution in the following manner: From the center of charge 20 as a point of origin, the pressure in each direction from the origin is represented by a radius $r$ proportional in length to the pressure. Accordingly, the line 26 represents the locus of the tips of all pressure-magnitude radii drawn from the center point of charge 20. From this plot it is apparent that the magnitude of the pressure observed at a given point A, close to the end of the charge 20 toward which the detonation proceeds, is much greater than at a point B equidistantly spaced from the end of the charge where detonation is initiated. Particle displacements on one side of a vertical plane perpendicular to and passing through the center of charge 20 are thus not compensated by equal and opposite particle displacements on the other side of this plane. As a result, an appreciable amount of shear-wave energy is produced by the charge 20, and when it is oriented as in Figure 2, the particle motions are horizontal and perpendicular to the line of detectors 22. Then, when reflection takes place at a subsurface interface 27 as shown in Figure 1, even at a point horizontally distant from charge 20, the particle motion is entirely within the plane of the interface 27, and consequently no conversion of the shear energy to other forms of wave transmission takes place. This is true regardless of the angle of incidence of the shear-wave energy from the charge 20 on the interface 27, and except for a component of dip of interface 27 perpendicular to the plane of Figure 1, which will normally be small. In other words, while shear waves can be received close to the wave source of this invention where they are normally not observed in the prior art, they can also be observed at quite large horizontal distances from the shot point, if desired.

This particle motion is most efficiently detected by the detectors 22 having sensitivity axes also horizontal and perpendicular to the detector line. By the same token, the response of the detectors 22 to compressional-wave energy and to surface and other types of interfering waves is minimized, because the particle motions of these waves generally lie in the plane of Figure 1 and thus are perpendicular to the sensitivity axes of the detectors.

Figures 4, 5:
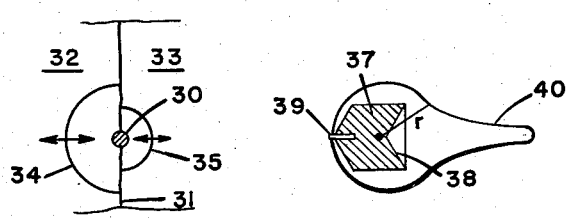
Figure 4 is a graphical representation of the non-symmetrical conditions around an exploding charge at a boundary between two media.
Figure 5 is a graphical representation of the pressure distribution around a charge containing a cavity; and, Figures 6 to 14, inclusive, are diagrammatic illustrations, mostly in cross section, of various embodiments of seismic-wave-creating explosive charges which utilize one or more symmetry-disturbing principles to increase vertical shear-wave generation.

There are other ways of providing a non-symmetrical distribution of wave pressures and resultant particle motions around an exploding charge. One of these is shown in Figure 4. Thus, if a relatively concentrated explosive charge 30 is placed at the boundary 31 between two media 32 and 33 of substantially different wave-transmitting properties, such as shale on the one hand as compared with hard sandstone or limestone on the other, then a plot of equal wave-front pressures in the two media might take the form of the two hemispheres 34 and 35 of unequal radii. The effect of this non-symmetry is greatest in the plane of boundary 31 so that a maximum propagation of shear wave energy takes place radially over this plane, with particle motions perpendicular to the plane.

Still another mechanism by which a non-symmetrical pressure field can be created around an explosive charge is illustrated in Figure 5. This represents an application of the well-known Munroe or cavity effect wherein a block of explosive 37 is provided with a concave face 38 and is detonated by initiation at a point 39. As is well known, the effect of the cavity 38 is to produce a concentration of the explosive power and pressures of the charge 37 in the direction of the cavity axis, as is suggested by the pressure profile 40, which is anlaogous to the profile 26 of Figure 3. As is apparent from this figure, there is no pressure equal and opposite to that which reaches its peak value on the axis of the cavity 38 in the direction which this cavity faces.

Figure 6:
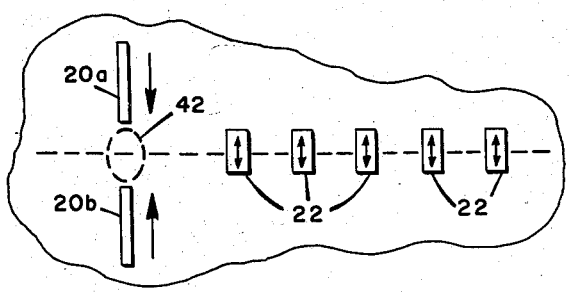

Figure 6 shows a modification of the embodiment of Figures 1 and 2 which possesses some added advantages over that embodiment. Thus, the seismic-wave-generating source comprises the two horizontal elongated charges 20a and 20b, preferably spaced from each other along a line perpendicular to the line of detectors 22, with the mid-point between the two charges on this line. Figure 6 is a plan view of this arrangement. Thus, when the charges 20a and 20b are detonated in the direction of the two arrows, namely toward the mid-point between them, the maximum non-symmetrical pressure effect takes place within the area surrounded by the dotted line 42.

If these charges are detonated simultaneously, then there is symmetry about the vertical plane, including the line of detectors. Accordingly, to make proper use of the non-symmetrical pressure field separately created by each of these charges, they are detonated with a time interval between the two initiations of detonation. Preferably, this time interval is equal to one-half of the apparent period of the seismic shear waves received by the detectors 22. Thus, if these waves have an apparent frequency of about 40 cycles per second, corresponding to a period of 25 milliseconds, the preferred time interval between initiation of the detonation of charges 20a and 20b would be 12.5 milliseconds. It will be observed that, when this is done, the generation of shear waves within the area of dotted outline 42 is not only intensified, but the natural frequency of these waves as received is emphasized by a kind of resonance phenomenon.

Figure 7:
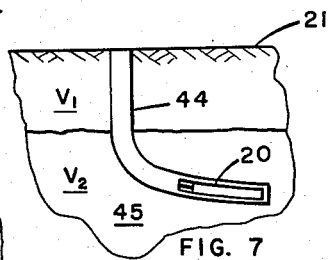

A further aspect of the invention is illustrated in Figure 7. The maximum non-symmetry of the pressure distribution 26 of Figure 3 is believed to occur when the velocity of travel of the detonation wave along the length of charge 20 is substantially equal to the velocity of propagation of longitudinal seismic waves in the earth medium around the charge. As is well known, the wave-propagation velocity in near-surface earth media is relatively low, and, as the detonation velocity of most explosive materials is relatively high, there is a substantial mis-match of these velocities.

Two possibilities of reducing this mis-match of detonation and wave-propagation velocities appear. One is to lower the effective detonation velocity along the charge material, either by utilizing a material of relatively slow propagation velocity, or in a way such as that disclosed in Silverman Patent 2,609,885 where the high-velocity explosive is arranged in a helical form. The other possibility is to place the elongated charge 20 in a horizontal position in a subsurface stratum of higher wave-propagation velocity than the surface materials.

Thus, by drilling a shot hole 44 from the ground surface 21 through the low velocity layer of velocity $V_1$ into a layer 45 of longitudinal wave transmission velocity $V_2$, the mis-match between detonation and wave velocity is substantially reduced. In order to position the charge 20 horizontally, at least the bottom portion of the shot hole 44 is drilled with a horizontal drilling tool, such as is frequently used in drilling lateral drain holes for wells in oil formations and as is described in U.S. Patent 2,336,334. It is of course easier also, in the case of velocity $V_2$, to adjust the detonation velocity to a substantially exact match.

Of course, two such shot holes 44 can be used to locate two charges 20a and 20b in the high velocity medium $V_2$ as was done for the near-surface medium in Figure 6. It is believed that such an arrangement represents about the maximum possible utilization of the principle explained by Figure 3, except for the use of two multiple-charge patterns to spread the wave generation over an area in a manner analogous to the use of a multiple-shot-hole pattern in place of a single conventional shot hole.

Figure 8:
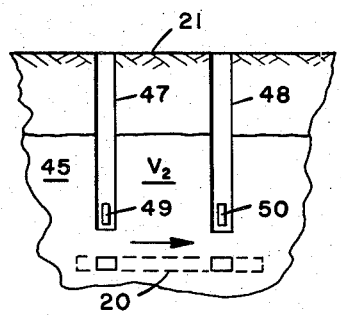

An approximation to the embodiment of Figure 7 is represented by Figure 8. Instead of the single horizontally-deviated shot hole 44, two spaced vertical shot holes 47 and 48 are drilled into the medium 45 of high velocity $V_2$, and two concentrated explosive charges 49 and 50, one in each of these holes, are detonated in a time sequence. By making the time interval between detonations of these two charges equal to the travel time of seismic waves at velocity $V_2$ from one of the shot holes 47 to the other hole 48, an approximation to the conditions of Figure 7 is obtained. In other words, the charges 49 and 50 represent two elements of the elongated charge 20 shown in dotted lines in Figure 8, and the effect of the spacing and the time interval between the detonations of the two charges 49 and 50 represents the choice of an optimum detonation velocity for the charge 20.

The use of two spaced shot holes of course represents the simplest manner of approximating the horizontal charge 20, since any desired greater number could be used between or in addition to the two holes 47 and 48. The preferred requirements are that the holes be located on a line perpendicular to the line of detectors 22 and that the successive charges in the shot holes along the line be fired with the correct time interval to approximate the longitudinal wave transmission velocity $V_2$ of the medium.

Figure 9:
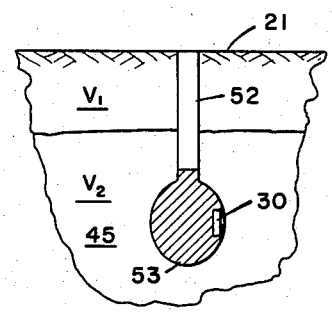

Figure 9 represents one method of making use of the principle of Figure 4, wherein the generation of the seismic waves takes place at a boundary between two different media. Thus, a shot hole 52 is drilled from the ground surface 21 through the low-velocity $V_1$ surface layer into the layer below, of higher velocity $V_2$. The bottom of the shot hole 52 is then preferably enlarged in some way, for example, by detonating a small charge of explosive in it to make a rounded cavity or "pot-hole" as it is sometimes called, or by using an underreaming type of drilling tool. Next, a concentrated charge of explosive 30 is lowered into the hole 52 and placed against one wall of the enlarged portion and held there while the enlarged portion of the hole is filled up with a medium 53. The medium 53 is chosen to have contrastingly different seismic-wave-transmission properties from the earth medium 45. Thus, when the charge 30 is detonated, energy is transferred by it to the medium 45 in a different manner and in different amounts than to the medium 53, so that there is a lack of symmetry in the pressure field around the charge 30 in the same manner as shown in Figure 4. It will be understood that the side of the hole against which the charge 30 is placed is that approximately tangential or parallel to the vertical plane including the line of detectors 22. That is, the direction in which the charge 30 is displaced from the center of the cavity in shot hole 52 is perpendicular to the detector line.

The material 53 filling the cavity of shot hole 52 may be any of a great many substances having different wave-transmission characteristics from the formation 45. It may be, for example, cement of either a conventional or a quick-setting type, or unconsolidated sand to mention a few of many possible substances. To the cement may be added, if desired, a material for increasing its density, such as powdered iron, iron oxide, barytes, or the like, such as is used for increasing the specific gravity of drilling muds. The use of a dense, heavy material like solidified weighted cement acts as a directional reflector for the energy of charge 30, while unconsolidated sand has the opposite effect of absorbing appreciably the energy of the charge 30 emitted in the direction of the shot-hole axis. A differential horizontal particle motion in a horizontal plane around the charge 30 is the result in either instance.

Figure 10:
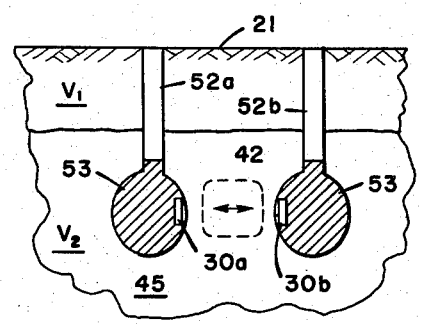

In Figure 10 is shown how the modification of Figure 9 may be employed in the same manner as the principles disclosed by Figure 6. Thus, two shot holes, 52a and 52b, located on a line perpendicular to the line of detectors 22 and spaced a short distance apart have the respective concentrated charges 30a and 30b placed on the sides of the hole enlargement nearest each other. With this arrangement, the optimum generation of shear waves in the volume of earth outlined by the line 42 takes place, with a preferred time interval between the detonation of the two charges equal to ½ of the shear-wave apparent period.

Figure 11:
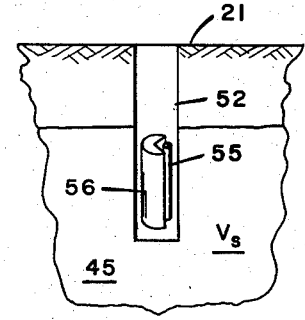

In Figure 11 is illustrated a further modification of the principle of Figure 4 wherein there is lowered into the shot hole 52 extending into the lower medium 45 an elongated vertical tube or rod of explosive placed in the concave portion of an elongated steel bar 56, preferably crescent-shaped in cross section. Bar 56 is sufficiently massive and of adequate strength to withstand the explosion pressures of the charge 55 without damage. Initiation of the detonation of charge 55 is preferably started at its upper end, and as nearly as possible the rate of progress of detonation along the length of the explosive column is made equal to the velocity of propagation $V_s$ of shear waves vertically in the formation 45. Thus, not only does the steel bar 56 act as a reflector to prevent symmetrical wave pressures around the bore hole 52 for each element of length of the exploding charge, but also the choice of velocity of progress of the detonation along the length of the charge is effective to build up a maximum horizontal shearing pressure. As the velocity of shear waves $V_s$ is ordinarily considerably different from the velocity $V_2$ of ordinary longitudinal waves in the medium 45, the matching of the charge detonation velocity to $V_s$ results in a mis-matching with the velocity $V_2$, so that vertical compressional energy from the charge 55 is relatively minimized.

Figure 12:
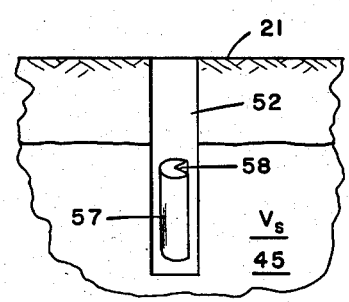

The same is true of the embodiment shown in Figure 12 with regard to choice of a longitudinal rate of propagation of detonation of the explosive. In Figure 12, however, the asymmetrical pressure field surrounding the elongated charge 57 is due, not to the presence of a reflector as in Figure 11, but to the presence of a cavity 58 extending along one side of the charge 57 from end to end. This cavity produces the effect illustrated in Figure 5, while the choice of detonation velocity equal to $V_s$ brings about additive generation of shear waves by successive increments of length of the explosive 57.

Figure 13:
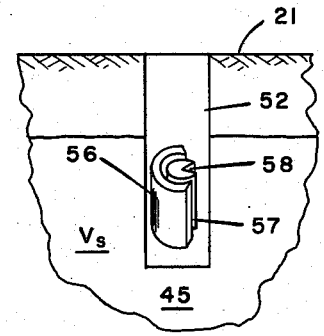

Still greater efficiency may be provided by combining the principles illustrated in Figures 11 and 12, as shown in Figure 13, wherein the elongated explosive 57 is backed up by the metallic shield 56 to produce reflection, while possessing the cavity 58 facing away from the shield 56 to emphasize the asymmetrical pressure distribution. As previously, the preferred velocity of detonation of explosive 57 matches the vertical shear-wave velocity $V_s$ of formation 45.

Figure 14:
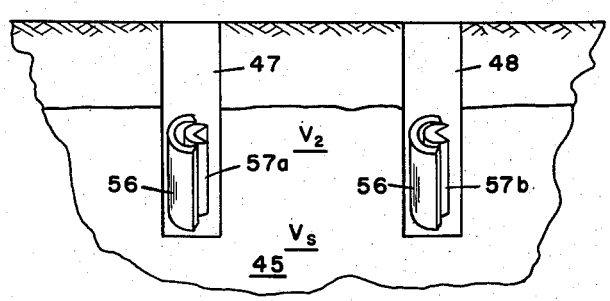

Figure 14 is believed to represent a combination of all of the various mechanisms for generating horizontally-polarized shear waves that have been discussed above. Thus, the embodiment of Figure 13 is employed in two spaced shot holes with the cavity and reflector in the same direction aligned so as to produce a maximum pressure perpendicular to the detector line 22. The time interval between initiation of detonation of the charges 57a and 57b in the respective shot holes 47 and 48 is made equal to the travel time of compressional waves in the medium 45 at velocity $V_2$ as in Figure 8, while the rate of travel of the detonation along the length of each of charges 57a and 57b is equal to the vertical shear velocity of seismic waves in this formation.

It is believed not necessary to illustrate how the principle of Figure 6 might be applied to this embodiment by rotating the charge 57b through 180° and firing it a time interval after 57a equal to one-half of the apparent shear-wave period. Likewise, it is believed obvious that four shot holes comprising two pairs of shot holes 47 and 48 could be employed, each pair respectively replacing one of charges 20a and 20b in the embodiment of Figure 6. Orientation of the charges and reflectors for each pair would be as shown in Figure 14, with the direction of maximum shear-wave generation of the two pairs of shot holes being opposed as in the linear charges of Figure 6.

While the foregoing arrangements of explosive produce shear waves with linear polarization primarily in a single horizontal direction, they do not exhaust all the possibilities of vertical shear-wave generation by explosives. Thus, a type of circular polarization might be produced with a vertically elongated explosive, or explosive and reflector, as in Figures 11, 12, and 13, twisted in a helix having a pitch about equal to the apparent shear wave length in the formation 45, the explosive being detonated at about half the shear-wave velocity $V_s$. It is likely that reflections of such waves would exhibit the applied circular polarization relatively close to the source. At large horizontal distances, the reflected shear waves would probably appear to be linearly polarized.

From the foregoing, some general observations may be made about time intervals between detonations of multiple-charge explosive arrangements. Where the non-symmetrical pressures of two horizontally spaced charges are directed in the same direction along the line between the charges, then the time interval between detonations should correspond to the seismic-wave travel time in the earth medium at longitudinal-wave velocity. Where the non-symmetrical pressures act in opposition to each other, the time interval between detonations should be one-half of the shear-wave apparent period. Where there is vertical elongation of any charge, the detonation velocity should ordinarily match the vertical formation shear-wave velocity, except as stated in the preceding paragraph.

While we have thus described our invention in terms of the foregoing details and modifications thereof, it is to be understood that its scope is not limited to the details set forth, but it is properly to be ascertained from the scope of the appended claims.

We claim:

1. A seismic surveying system comprising, in combination, a plurality of spaced seismic shear-wave receivers having their maximum sensitivity axes oriented substantially parallel to each other and in a given horizontal direction, means connected to said receivers for recording indications of their outputs, and explosive means for generating shear waves at a location near said receivers, said explosive means comprising explosive material adjacent a wave-transmitting medium and disposed in at least one pattern horizontally elongated in said given direction, and means for initiating detonation of said material at one end of said pattern to cause horizontally spaced increments of said explosive material to be detonated in a time sequence starting from said one end of said pattern.

2. A system in accordance with claim 1 in which two of said patterns are horizontally spaced apart and are adapted to be detonated in opposite senses with respect to said given direction, and in which said detonation-initiating means are adapted to initiate the detonation of said two patterns about one-half of an apparent seismic shear-wave period apart in time.

3. A system in accordance with claim 1 in which the detonation of successive ones of said spaced increments substantially coincides with the travel of compressional seismic waves through the adjacent earth medium along said pattern.

4. A system in accordance with claim 3 in which said increments form a substantially continuous linear horizontal explosive having a detonation propagation velocity approximately matching the horizontal compressional seismic-wave velocity of the adjacent earth medium.

5. A system in accordance with claim 3 in which said increments are horizontally spaced explosive charges in different bore holes, each of said charges except the first to be detonated being provided with a detonation-initiating means adapted to detonate it coincident with the arrival of a compressional seismic wave through the adjacent earth medium from the first detonated of said charges.

References Cited in the file of this patent

UNITED STATES PATENTS 2,740,489     White ------------------ Apr. 3, 1956